Jan. 28, 1958 L. A. WIEGEL 2,821,312
FRUIT PICKING APPARATUS
Filed Sept. 28, 1956 5 Sheets-Sheet 1
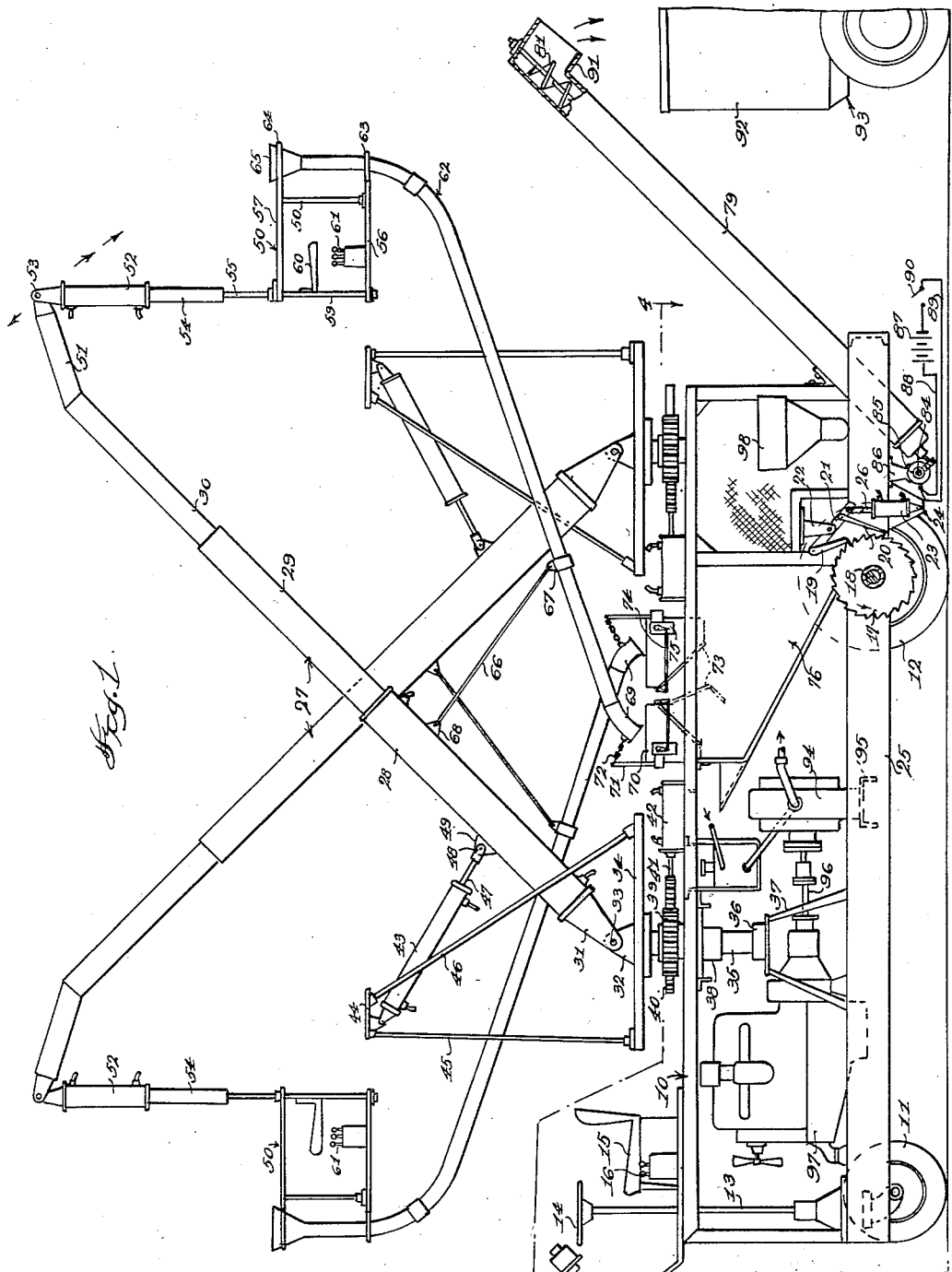
INVENTOR
L. A. WIEGEL
BY
ATTORNEYS.

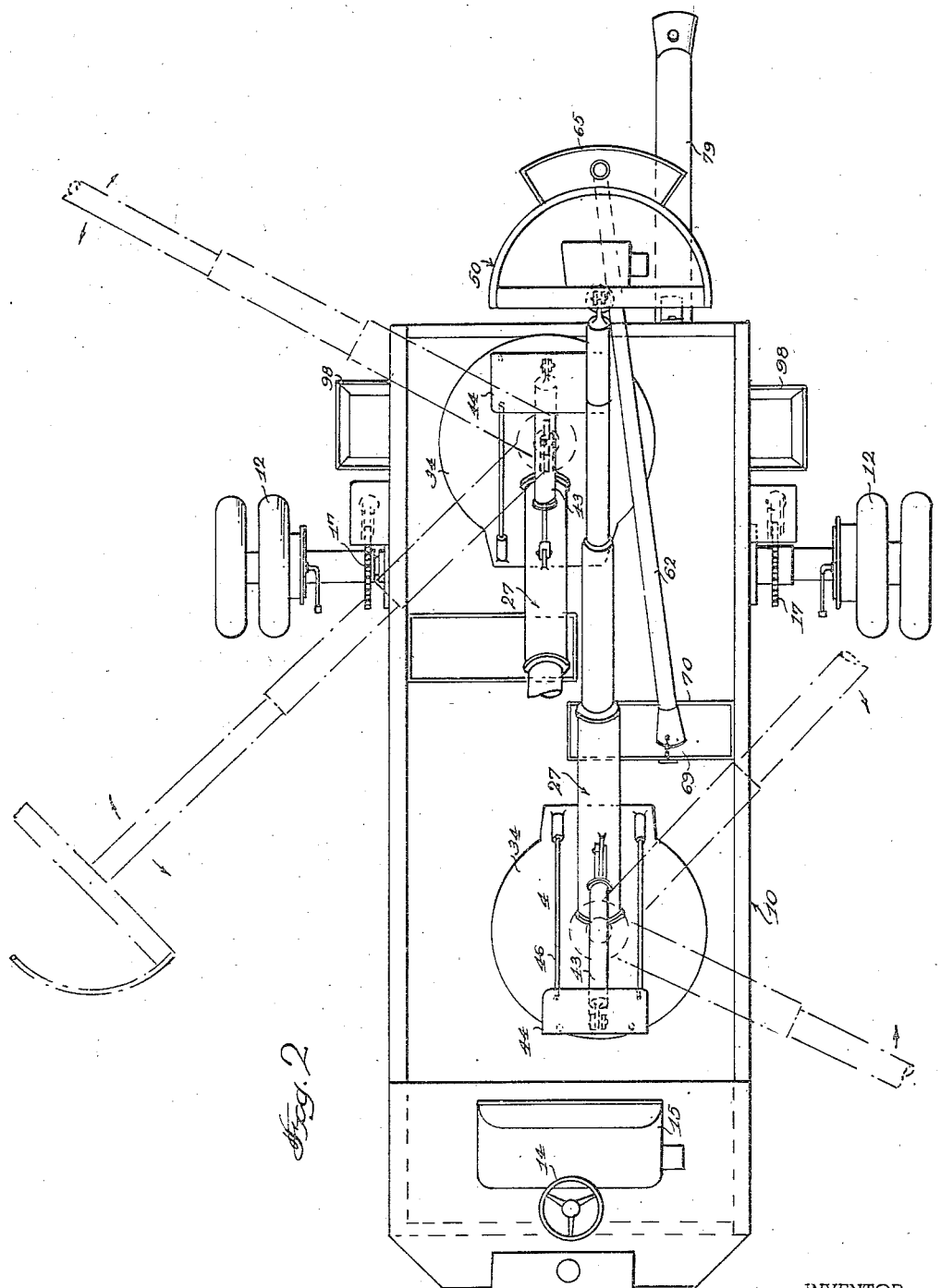

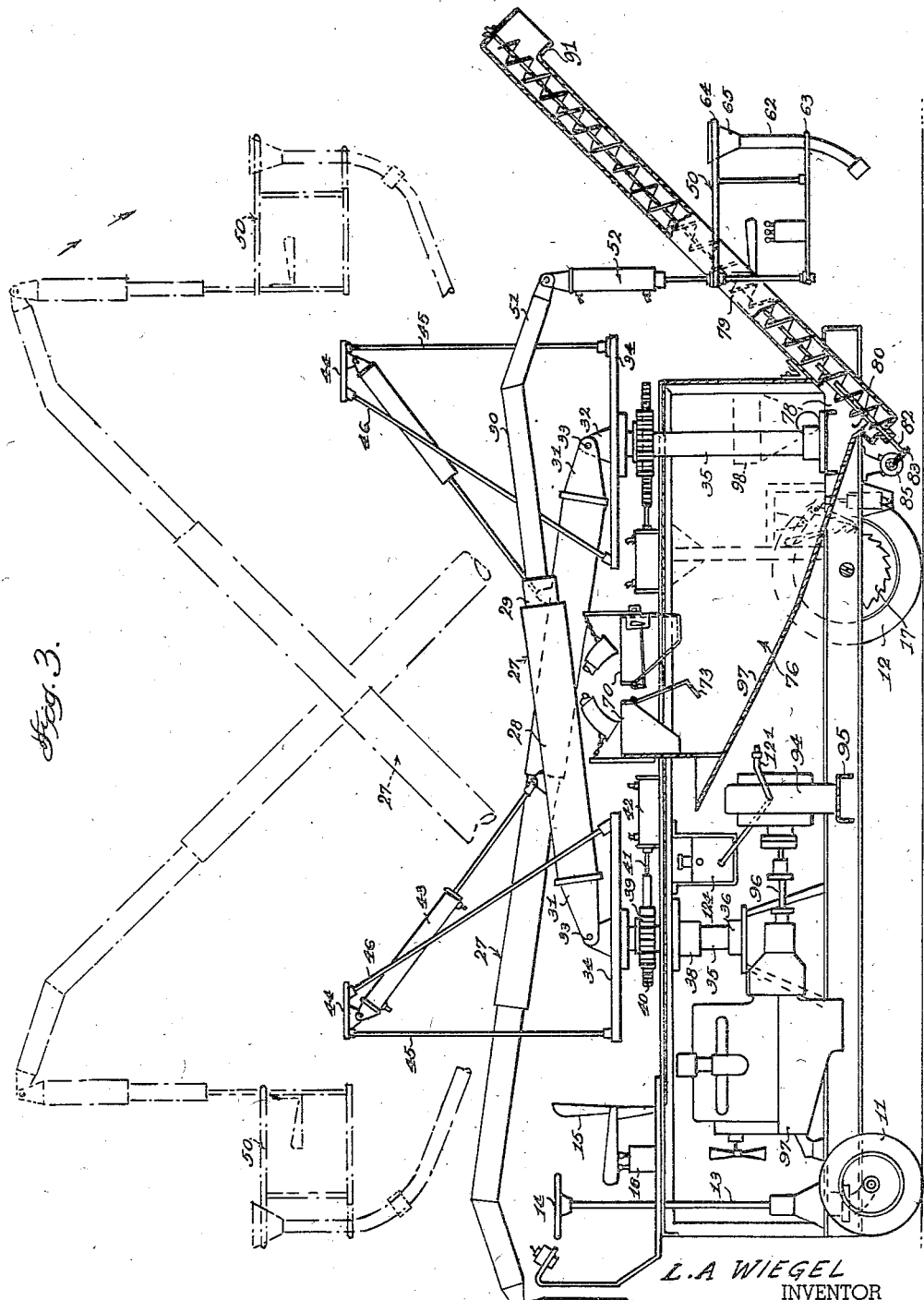

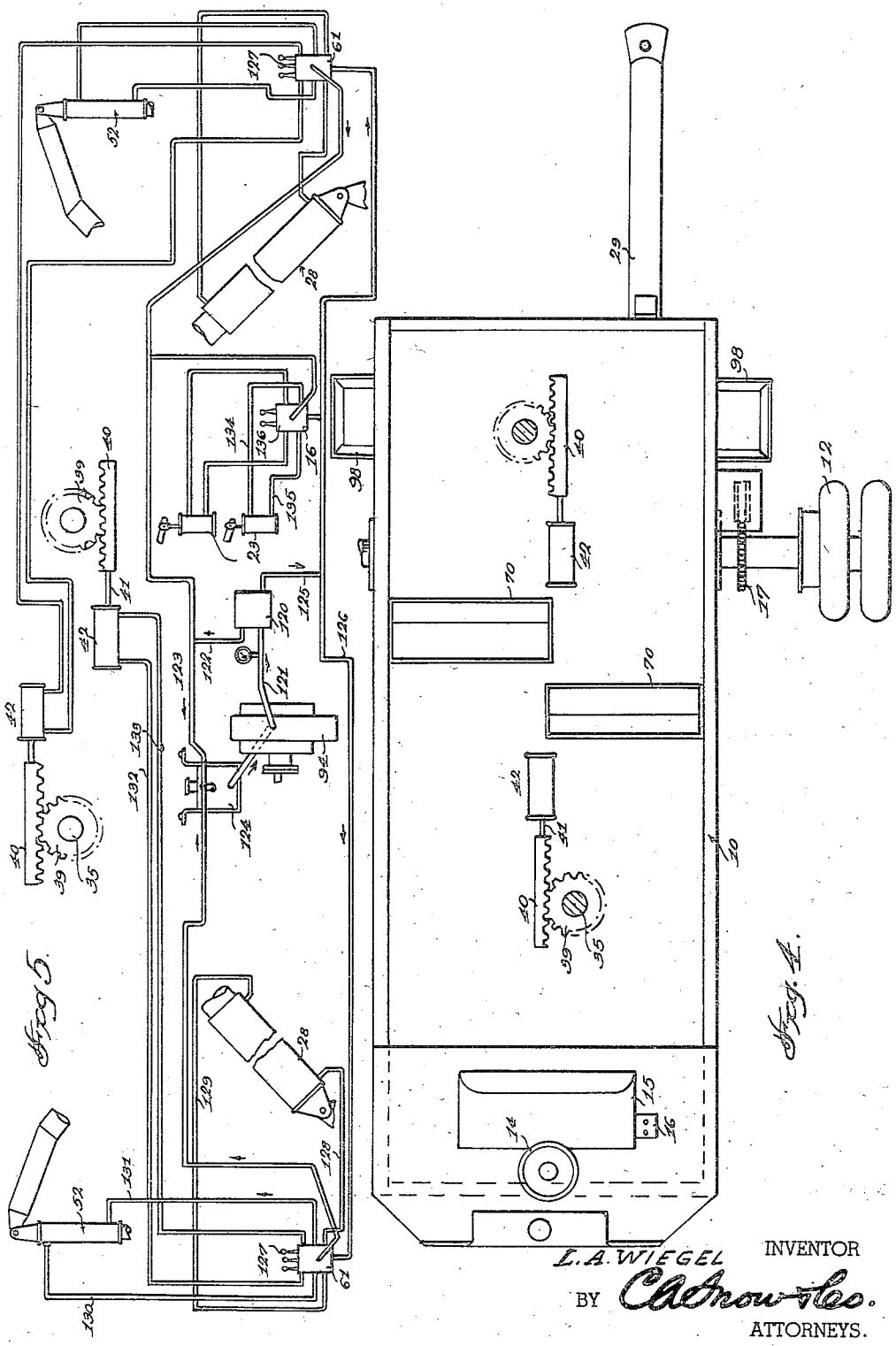

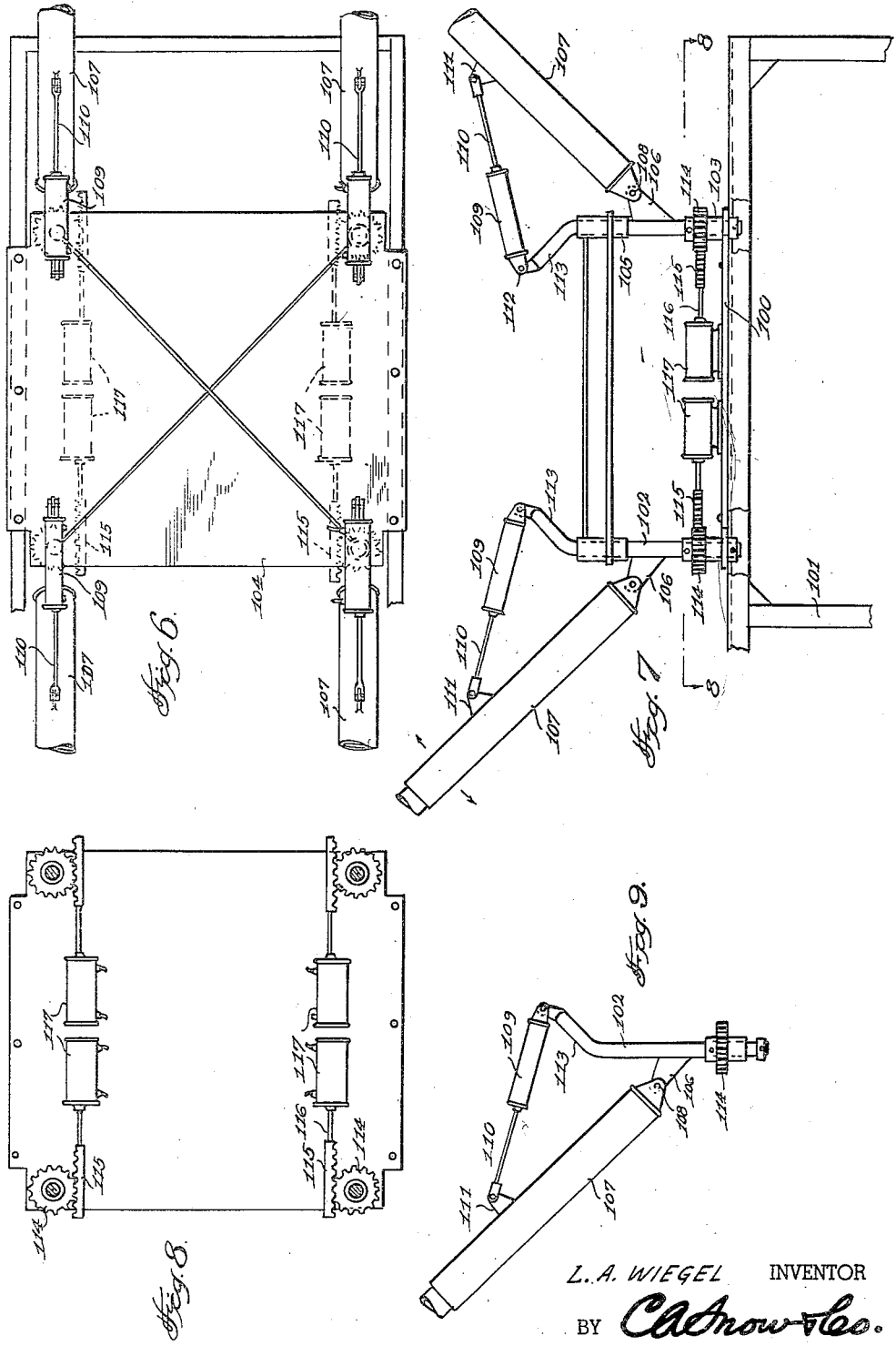

United States Patent Office 2,821,312
Patented Jan. 28, 1958

2,821,312

FRUIT PICKING APPARATUS

Louis A. Wiegel, Pine Castle, Fla., assignor to Pick-In-Rig, Inc., Orlando, Fla.

Application September 28, 1956, Serial No. 612,857

3 Claims. (Cl. 214—83.1)

This invention relates to fruit picking apparatus.

An object of this invention is to provide an improved means whereby a picker may remove fruit from trees without damage to the fruit or the trees.

Another object of this invention is to provide a fruit picking apparatus which includes a cradle on which a picker is able to sit or stand with means for adjustably suspending the cradle so that the picker can reach the tree.

A further object of this invention is to provide a fruit picking apparatus which includes a base structure with a boom swingably mounted on the base, and a cradle suspended from the outer end of the boom, with the control means for the cradle and boom disposed in the cradle in order that the picker positioned in the cradle may adjust the position of the boom and the cradle relative to the tree.

A further object of this invention is to provide a fruit picking apparatus which includes a cradle, a boom supporting the cradle, and a flexible fruit guiding duct leading from the cradle to a collector.

In the modified form of this invention there is provided a vertically adjustable platform or base which has a plurality of booms mounted thereon, with each boom independently operable and each boom having a picker cradle on the outer end.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a detail side elevation partly broken away in section of a fruit picking machine constructed according to an embodiment of this invention.

Fig. 2 is a plan view of the machine.

Fig. 3 is a longitudinal section taken through the machine.

Fig. 4 is a sectional view taken substantially on line 4—4 of Fig. 1.

Fig. 5 is a diagrammatic view showing the fluid control means for the booms.

Fig. 6 is a fragmentary plan view of a modified form of this invention.

Fig. 7 is a fragmentary side elevation of the structure shown in Fig. 6.

Fig. 8 is a sectional view taken on line 8—8 of Fig. 7.

Fig. 9 is a detail side elevation showing one of the booms embodied in the modified form shown in Figs. 6, 7 and 8.

Referring to the drawings, and first to Figs. 1 to 5 inclusive, the numeral 10 designates generally a mobile frame structure having spherical front wheels 11 and rear traction wheels 12 which are rotated as will be hereinafter described. The front wheels 11 are connected in a conventional manner to a vertical steering post 13 having a steering wheel 14 on the upper end thereof. A front or operator's seat 15 is mounted on the forward portion of the frame 10 and engine controlling means 16 are disposed adjacent the seat 15.

The frame 10 is adapted to be moved forwardly during the picking of the fruit and the movement of the device from the tree by means of a ratchet wheel 17 which is mounted on the rear axle 18. The axle 18 is fixed relative to the wheels 12 and the ratchet wheel 17 has a pair of dogs or pawls 19 and 20 engaging therewith. The two dogs 19 and 20, are mounted in a rock lever 21 which is rockably carried by a support 22. A hydraulic or pressure cylinder 23 is carried by a bracket 24 projecting downwardly from the lower side frame members 25 of the frame 10. The pressure member or operator 23 has a plunger rod 26 projecting upwardly therefrom which is pivotally connected with the rock lever 21. The two dogs or pawls 19 and 20 are of the walking type so that the ratchet wheel 17 will be held against reverse rotation as the ratchet wheel is rotated forwardly or in a counterclockwise direction, as viewed in Fig. 1.

A pair of lengthwise extendable booms generally indicated at 27 are rockably carried by the frame 10 and the description of the details of construction of one boom will apply equally as well to the other boom. Each boom 27 is formed of a lower tubular member 28 with extensible members 29 and 30 adapted to telescope into the inner or lower member 28 to be extended outwardly therefrom as may be desired. The lower or inner end of the cylinder or tubular member 28 has a pair of ears 31 projecting therefrom which are pivotally secured to an upstanding ear 32 by means of a pivot 33. The ears 32 are fixed to the upper side of a platform 34 and the platform 34 is fixed to the upper end of a vertical shaft 35. The shaft 35 extends downwardly through the frame 10 and the lower end of the shaft 35 engages in a lower bearing 36 supported by supporting members 37 extending upwardly from the lower portion of the frame 10.

The shaft 35 also rotatably engages through intermediate bearings 38 carried by the upper portion of the frame 10 and a spur gear 39 is fixed on shaft 35. The gear 39 is adapted to be selectively rotated so as to swing platform 34 and boom 27 by means of an elongated gear rack 40 which is fixed to and extends from a plunger 41. The plunger 41 extends from a hydraulic or pressure operator 42 which is carried by the upper side of the frame 10. The boom 27 is adapted to be angularly adjusted with respect to the vertical by means of a hydraulic operator 43. The operator 43 is pivotally secured to a supporting plate 44 which is disposed above the platform 34 and is supported above the platform 34 by means of upstanding supporting rods 45 and 46. The operator 43 includes a plunger 47 which is pivotally secured as at 48 to an ear 49 fixed to the lower cylinder 28.

A picker's cradle generally indicated at 50 is swingably and pivotally secured by the support from the outer end of the boom 27. The boom 27 includes an obtusely inclined outer boom section 51 which extends from the boom member 30 and a hydraulic or pressure cylinder 52 is pivotally mounted at 53 on the outer end of the boom section 51. The hydraulic member or cylinder 52 includes an extensible member 54 slidable in the cylinder 52 and also includes a second extensible member or plunger 55. The plunger 55 is secured to the cradle 50. The cradle 50 is formed of a platform or floor 56 with an arcuate rail 57 supported above the floor 56 by means of supporting bars 58 and 59. A seat 60 is carried by the cradle 50 and hydraulic control members 61 are carried by the floor 56 of cradle 50 and are connected in a conventional manner to the hydraulic cylinder 42 and cylinder 28. The control 61 also includes the connections to the hydraulic pressure cylinder 52 whereby the cradle 50 may be vertically adjusted when the boom 27 has been angularly adjusted to a desired position. A fruit guiding chute 62 of flexible material is secured by fastening means 63 and 64 to the cradle 50. The upper intake end of the chute 62 has a funnel 65 secured thereto in order to facilitate the dropping or placement of the fruit into the upper intake end of the chute. The flexible chute 62 is supported between the ends thereof by means of a supporting or bracing bar 66 which is secured at one end to a clamp 67 engaging about the chute 62 and is secured at the other end as at 68 to the boom cylinder 28.

The lower discharge end of the chute 62 includes a nozzle 69 which is supported above a measuring receptacle 70 by means of a supporting bar 71 and a chain or flexible member 72. The measuring member 70 includes a pivoted bottom structure 73 which is connected by means of a link 74 to a mounting mechanism 75. When the collector or receptacle 70 is substantially filled bottom 73 will swing downwardly to the dotted line position, as shown in Fig. 1, whereby the fruit will be discharged from the receiver 70 into a hopper 76. The hopper 76 is disposed at the rear of the frame 10 and the hopper 76 includes a downwardly and rearwardly inclined bottom wall 77 which directs the fruit to a discharge opening 78. An upwardly and rearwardly inclined conveyor housing 79 is secured to the rear of the frame 10 and the housing 79 is formed with a lower intake opening 80 so that the fruit from hopper 76 may enter the lower intake end of the conveyor housing 79. A screw 81 is rotatable in the housing 79 and includes a shaft 82 extending from the lower end thereof which has a worm gear 83 fixed thereon. The worm gear 83 has meshing therewith a worm 84 rotated by means of an electric motor or power member 85. The motor or power member 85 is supported below the lower frame member 25 by means of supporting brackets 86 and power member 85 is connected to a battery 87 by means of conductors 88 and 89. A switch 90 is interposed in conductor 89.

The housing 79 has a discharge nozzle 91 at the upper end thereof so that the fruit elevated by the screw 81 may be discharged into the body 92 of a truck, generally indicated at 93, and shown in Fig. 1. The pressure for use in operating the various hydraulic members or pressure operators, is generated by means of a pump 94 which is supported by means of a transversely extending channel member 95 which extends between the lower frame members 25. The top 94 includes a shaft 96 which is connected with an engine 97.

The fruit which has fallen from the tree may be picked up and discharged into the hopper 76 by means of a pair of side hoppers 98 which extend from the opposite sides of hopper 76. These side hoppers 98 which are shown in Figs. 1 and 2 are adapted to discharge the fruit into the lower rear portion of hopper 76.

Referring now to Figs. 6 to 9, inclusive, there is disclosed a modified form of this invention. A platform 100 is provided with supporting legs 101 which may be mounted on a mobile frame similar to frame 10. The platform 100 has rotatably mounted at each corner thereof vertically disposed boom supporting shafts 102. The shafts 102 are rotatably carried by bearings 103 which are carried by the platform 100. An upper platform or plate 104 is provided with bearings 105 through which the boom supporting shaft 102 rotatably extends. Each shaft 102 has a laterally projecting ear 106 extending therefrom between the platforms 100 and 104. The lower or inner end of a boom 107 which is similar to boom 27 is pivotally mounted on the ear 106, indicated by the pivot 108. The angular position of boom 107 with respect to the vertical is adjusted by means of a hydraulic member 109 and a plunger 110 extending therefrom, which is pivotally connected to an ear 111 carried by the upper side of the boom 107. The inner or rear end of the hydraulic member 109 is pivotally secured as at 112 to the upper end of an obtusely inclined extension 113 which is formed integral with the shaft 102. Each shaft 102 has fixed thereon a spur gear 114 and a gear rack 115 meshes with spur gear 114 and is connected to the plunger rod 116 of a hydraulic boom adjusted member 117. The boom adjusting member 117 is fixed to the upper side of the lower platform 100.

It will be understood that each boom 107 includes a cradle similar to cradle 50 with the boom control members 61 connected with the boom adjusting means shown in Figs. 6 to 9 inclusive.

Referring now to Fig. 5 wherein the controls and pipe lines to the several hydraulic members are diagrammatically shown, the pump 94 has the pressure side thereof connected to the conventional pressure relief member 120 by means of a pipe 121. The relief member 120 includes a return line 122 which is connected to a main return line 123 which leads to a supply tank 124. The outlet side of the relief member 120 is connected by means of a pipe 125 to a main pressure line 126. The pressure line 126 is connected to the control member 61 which includes a plurality of valve operators 127. The control member 61 has one line 128 extending therefrom and connected to the lower end boom cylinder 28. The upper end of the boom cylinder 28 is connected by means of a pipe line 129 to the control member 61. The cradle supporting member 52 is connected by means of a pipe line 130 and 131 to the controlling member 61 so that the cradle may be vertically adjusted as may be desired. The boom 27 is rotatably adjusted relative to the frame 10 by the hydraulic member 42 and member 42 is connected by means of a pair of pipe lines 132 and 133 to the controlling member 61. The ratchet operating member 23 is connected to the controlling member 16 by means of a pair of pipe lines 134 and 135 and controlling member 16 is connected to the main pressure line 126 by means of a pipe 136.

In the use and operation of this machine the machine is moved by means of the hydraulic operator 123 and ratchet 17 with pawls 19 and 20, to the desired location. It will be understood also that the machine may be initially towed to the orchard. When the mobile frame 10 is disposed adjacent the pair of rows of trees the two booms shown in Fig. 1 may be angularly adjusted so that one boom will be in position, whereby the picker may pick the fruit from one row of trees, and the second boom may pick the fruit from the adjacent row of trees. The picker will enter the cradle 50 when the latter is in its lowered position, as shown in Fig. 3, and the picker may then by operation of the control levers 127 adjust the vertical inclination of the boom 27 and may also extend the boom 27 to the desired height. The fruit which is picked by the picker is dropped into the funnel 65 and will roll downwardly through the chute 62 into the measuring receptacle 70. When the receptacle 70 is filled bottom 73 will swing downwardly to an open position for discharging the fruit into the hopper 76. The fruit on the ground will be picked up by one or more pickers disposed on the ground and this fruit on the ground will be discharged into the side hoppers 98.

When the hopper 76 is filled to the desired degree this hopper may be emptied and the fruit discharged into the hopper body of a truck 93 by operation of the conveyor screw 81. With a fruit picking machine as hereinbefore described, it will be possible to rapidly pick the fruit from the upper portions of the trees without danger to the trees, or without injuring the fruit.

What is claimed is:

1. A fruit picking apparatus comprising a mobile base, means for moving said base, a turntable rotatably carried by said base, means for turning said turntable, a boom rockably secured at one end to said turntable, means angularly adjusting said boom relative to the vertical, a picker supporting cradle, means suspending said cradle from the other end of said boom, said suspending means including means for vertically adjusting said cradle, a flexible chute fixed at one end to said cradle and extending downwardly therefrom, a collector carried by said base, into which the other end of said chute discharges, a tubular elevator housing extending upwardly and rearwardly from said collector, the lower end of said housing communicating with said collector, a screw elevator in said housing, and means rotating said screw.

2. A fruit picking apparatus comprising a mobile base, means for moving said base, a turntable rotatably carried by said base, hydraulic means for turning said turntable, a boom rockably secured at one end to said turntable, hydraulic means angularly adjusting said boom relative to the vertical, a picker supporting cradle, means suspending said cradle from the other end of said boom, said suspending means including hydraulic means for vertically adjusting said cradle, a flexible chute fixed at one end of said cradle and extending downwardly therefrom, a collector carried by said base into which the other end of said chute discharges, a tubular elevator housing extending upwardly and rearwardly from said collector, the lower end of said housing communicating with said collector, a screw elevator in said housing, means for rotating said screw, and pump means for actuating said hydraulic means.

3. A fruit picking apparatus comprising a mobile base, means for moving said base, a turntable rotatably carried by said base, hydraulic means for turning said turntable, a boom rockably secured at one end to said turntable, hydraulic means angularly adjusting said boom relative to the vertical, a picker supporting cradle, means suspending said cradle from the other end of said boom, said suspending means including hydraulic means for vertically adjusting said cradle, a flexible chute fixed at one end of said cradle and extending downwardly therefrom, a collector carried by said base into which the other end of said chute discharges, a tubular elevator housing extending upwardly and rearwardly from said collector, the lower end of said housing communicating with said collector, a screw elevator in said housing, means for rotating said screw, pump means for actuating said hydraulic means, and valve means for selectively controlling the actuation of said hydraulic means.

References Cited in the file of this patent

UNITED STATES PATENTS

| | | |
|---|---|---|
| 2,448,630 | Schutz | Sept. 7, 1948 |
| 2,450,152 | Miller | Sept. 28, 1948 |
| 2,562,634 | Nelson | July 31, 1951 |
| 2,601,092 | Cardiff | June 17, 1952 |
| 2,606,078 | Brock | Aug. 5, 1952 |
| 2,616,768 | Stemm | Nov. 4, 1952 |